(12) United States Patent
Tange et al.

(10) Patent No.: US 6,401,024 B1
(45) Date of Patent: Jun. 4, 2002

(54) VEHICLE FOLLOW-UP CONTROL SYSTEM

(75) Inventors: Satoshi Tange, Kanagawa; Kenichi Egawa, Tokyo; Tetsuya Asada; Akira Higashimata, both of Kanagawa, all of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/592,253

(22) Filed: Jun. 12, 2000

(30) Foreign Application Priority Data

Jun. 15, 1999 (JP) ............................................ 11-168263

(51) Int. Cl.$^7$ ............................................. G01S 13/93
(52) U.S. Cl. ............................. 701/96; 701/93; 180/170
(58) Field of Search .............................. 701/96, 93, 36, 701/53; 180/168, 169, 170

(56) References Cited

U.S. PATENT DOCUMENTS

| | | | | |
|---|---|---|---|---|
| 5,396,426 A | * | 3/1995 | Hibino et al. ................. | 701/96 |
| 5,400,864 A | | 3/1995 | Winner et al. ............... | 180/169 |
| 5,629,669 A | | 5/1997 | Asano et al. ................ | 340/436 |
| 5,752,214 A | | 5/1998 | Minowa et al. ............. | 701/111 |
| 5,938,714 A | * | 8/1999 | Satonaka ..................... | 701/96 |
| 5,959,572 A | | 9/1999 | Higashimata et al. ......... | 342/70 |
| 6,044,321 A | * | 3/2000 | Nakamura et al. ............ | 701/96 |
| 6,070,682 A | | 6/2000 | Isogai et al. ................. | 180/167 |
| 6,175,799 B1 | * | 1/2001 | Tsutsumi et al. ............. | 701/96 |
| 6,192,307 B1 | * | 2/2001 | Okamoto et al. ............. | 701/70 |
| 6,249,738 B1 | * | 6/2001 | Higashimata et al. ......... | 701/96 |

FOREIGN PATENT DOCUMENTS

| | | |
|---|---|---|
| DE | 44 18 085 | 11/1994 |
| DE | 197 43 546 | 4/1998 |
| EP | 0 874 149 | 10/1998 |
| JP | 10-272963 | 10/1998 |

OTHER PUBLICATIONS

Patent Abstracts of Japan, "Car Running Control Device", Publication No. 61006035, Published Nov. 1, 1986, by Akira Tachibana.

* cited by examiner

*Primary Examiner*—William A. Cuchlinski, Jr.
*Assistant Examiner*—Olga Hernandez
(74) *Attorney, Agent, or Firm*—Foley & Lardner

(57) ABSTRACT

A preceding-vehicle follow-up control system is arranged to calculate a target vehicle speed based on a vehicle-to-vehicle distance and a controlled-vehicle speed, to calculate a target acceleration based on the target vehicle speed and to control driving force and braking force of the controlled vehicle based on the target acceleration. During this control period, the target acceleration is limited by an acceleration limit and a deceleration limit which are varied according the controlled-vehicle speed, respectively. This arrangement enables a follow-up vehicle speed control to be preferably executed without applying a strange feeling to a driver.

15 Claims, 6 Drawing Sheets

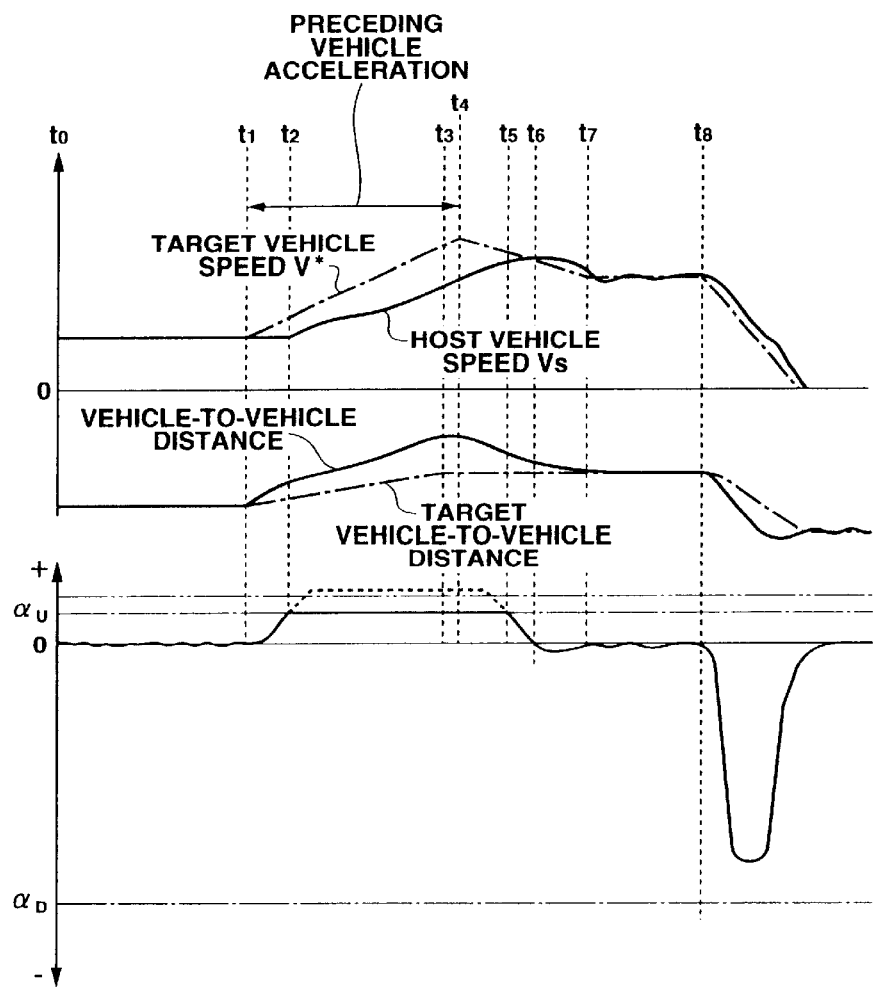

VEHICLE FOLLOW-UP CONTROL SYSTEM

BACKGROUND OF THE INVENTION

The present invention relates to a preceding vehicle follow-up control system for enabling a controlled vehicle to recognize a preceding vehicle and to follow up the preceding vehicle while keeping a vehicle-to-vehicle distance.

Japanese Patent Provisional Publication No. 10-272963 has disclosed a typical preceding vehicle follow-up control apparatus which executes a follow-up of a preceding vehicle on the basis of a vehicle-to-vehicle distance and a relative speed.

SUMMARY OF THE INVENTION

This conventional preceding vehicle follow-up control apparatus is basically arranged to bring the vehicle-to-vehicle distance closer to a target distance by employing a simply control and to limit acceleration and deceleration of the controlled vehicle for the purpose of improving riding quality in various situations.

However, the limits of the acceleration and the deceleration are generally set at predetermined values, respectively, and therefore it is difficult that these limits suitably function in both a high vehicle speed range and a low vehicle speed range.

It is therefore an object of the present invention to provide a preceding vehicle follow-up control system which enables a vehicle speed control matched with the a drive feeling of a driver by setting a target acceleration/deceleration according to a traveling condition of the controlled vehicle.

A preceding vehicle follow-up control system according to the present invention is for a vehicle and comprises a vehicle-to-vehicle distance detector, a vehicle speed detector and a controller. The vehicle-to-vehicle distance detector detects a distance between a controlled vehicle and a preceding vehicle and outputs a signal indicative of the vehicle-to-vehicle distance to the controller. The vehicle speed sensor detects a vehicle speed of the controlled vehicle and outputs a signal indicative of the vehicle speed to the controller. The controller comprises a vehicle-to-vehicle distance controlling section and a vehicle speed controlling section. The vehicle-to-vehicle distance controlling section calculates a target vehicle speed for bringing the vehicle-to-vehicle distance closer to a target vehicle-to-vehicle distance, on the basis of the vehicle-to-vehicle distance and the vehicle speed. The vehicle speed controlling section controls driving force of the controlled vehicle at a target driving force so as to bring the controlled-vehicle speed closer to the target vehicle speed. The vehicle speed controlling section calculates target acceleration for the target driving force on the basis of the target vehicle speed and limits the target acceleration according to the controlled-vehicle speed.

BRIEF DESCRIPTION OF THE DRAWINGS

FIGS. 7A to 7C are time charts showing a vehicle speed control condition under a low vehicle speed region.

DETAILED DESCRIPTION OF THE INVENTION

Referring to FIGS. 1 to 7C, there is shown an embodiment of a preceding vehicle follow-up control system according to the present invention.

Figure 1:
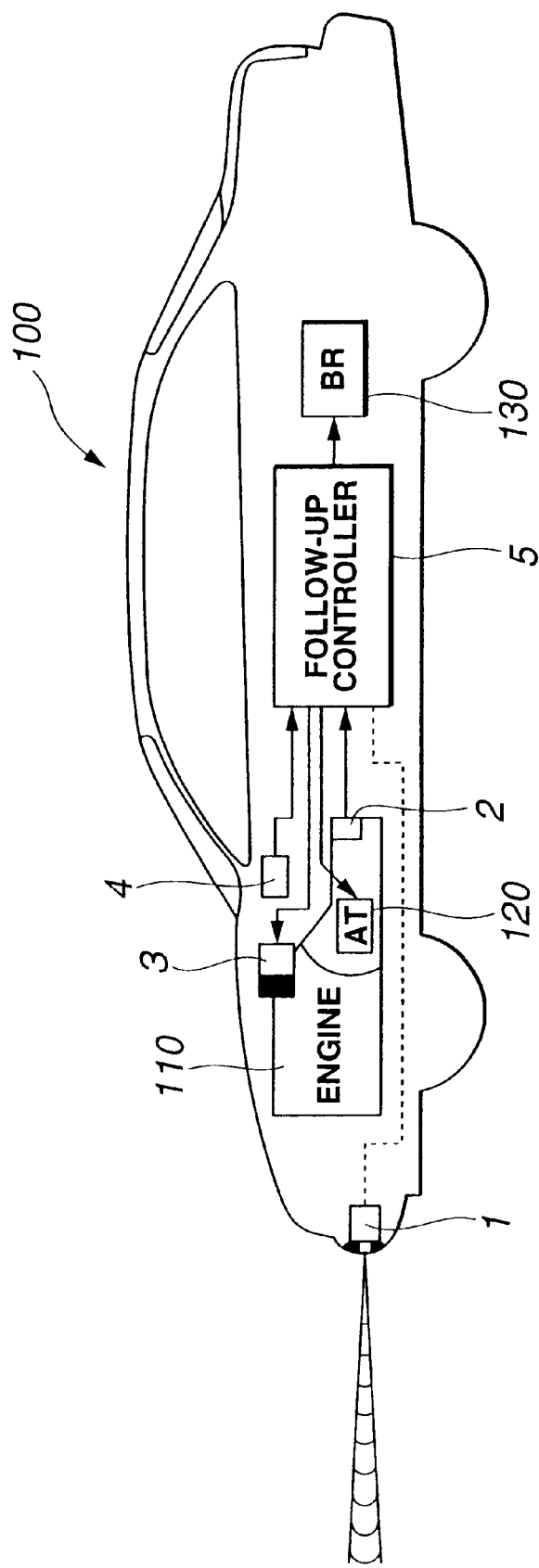
FIG. 1 is a schematic view showing a construction of an embodiment of a preceding vehicle follow-up control system according to the present invention.

As shown in FIG. 1, the preceding vehicle follow-up control system is employed in an automotive vehicle (host vehicle or controlled vehicle) 100. The preceding vehicle follow-up control system comprises a vehicle-to-vehicle distance sensor 1 installed at a front portion of the controlled vehicle 100. The vehicle-to-vehicle distance sensor 1 is of a radar type arranged to sweepingly output laser beam to a forward side of the controlled vehicle 100 and to receive light reflected by a preceding vehicle. It will be understood that radio wave or ultrasonic wave instead of laser beam may be employed in the vehicle-to-vehicle distance sensor 1 to measure a vehicle-to-vehicle distance.

The controlled vehicle 100 is equipped with an internal combustion engine 110, an automatic transmission 120 coupled to the engine 110, and a braking system 130. The engine 110 generates rotational driving force and transfers it to the automatic transmission 120. The automatic transmission 120 selects a preferred transmission ratio according to the vehicle speed and an engine torque to change the rotation speed, and transmits the driving force to driving wheels such as rear wheels or front wheels. The braking system 130 has four disc brake units installed to four wheels of the controlled vehicle 100, respectively and generates braking force according to a demand of a driver or commands from various controllers including a follow-up controller 5 of the preceding vehicle hollow-up system.

The follow-up controller 5 is connected to a throttle actuator 3 of the engine 110, the automatic transmission 120 and the braking system 130 and is arranged to control them independently. The follow-up controller 5 is further connected to the vehicle-to-vehicle distance sensor 1, a vehicle speed sensor 2 and an acceleration demand switch 4 and receives signals therefrom. The vehicle speed sensor 2 is installed to an output shaft of the automatic transmission 120 and outputs a pulse train signal having a cycle period corresponding to a rotation speed of the output shaft of the automatic transmission 120. That is, the vehicle speed sensor 2 detects a vehicle speed (controlled vehicle speed or host vehicle speed) of the controlled vehicle in the form of the pulse train signal and sends the signal indicative of the host vehicle speed Vt to the follow-up controller 5. The throttle actuator 3 is installed to the engine 110 and varies an opening of a throttle valve according to a throttle valve opening signal sent from the follow-up controller 5 to control the output of the engine 110 by varying air intake quantity of the engine 110. The acceleration demand switch 4 of a self-lock type is provided at a proper portion near the driver, such as an instrument panel, a steering wheel or a selector knob so that the driver can easily operate it to send a switch signal AS indicative of a driver's acceleration demand to the follow-up controller 5.

The follow-up controller 5 executes a follow-up control for following up a preceding vehicle while keeping a proper vehicle-to-vehicle distance between the preceding vehicle and the controlled vehicle 100. More specifically, the follow-up control is executed by controlling the throttle actuator 3, the automatic transmission 120 and the braking system 130 on the basis of the vehicle-to-vehicle distance L detected by the vehicle-to-vehicle distance sensor 1, the host vehicle speed Vs detected by the vehicle speed sensor 2 and the switch signal AS of the acceleration demand switch 4.

Figure 2:
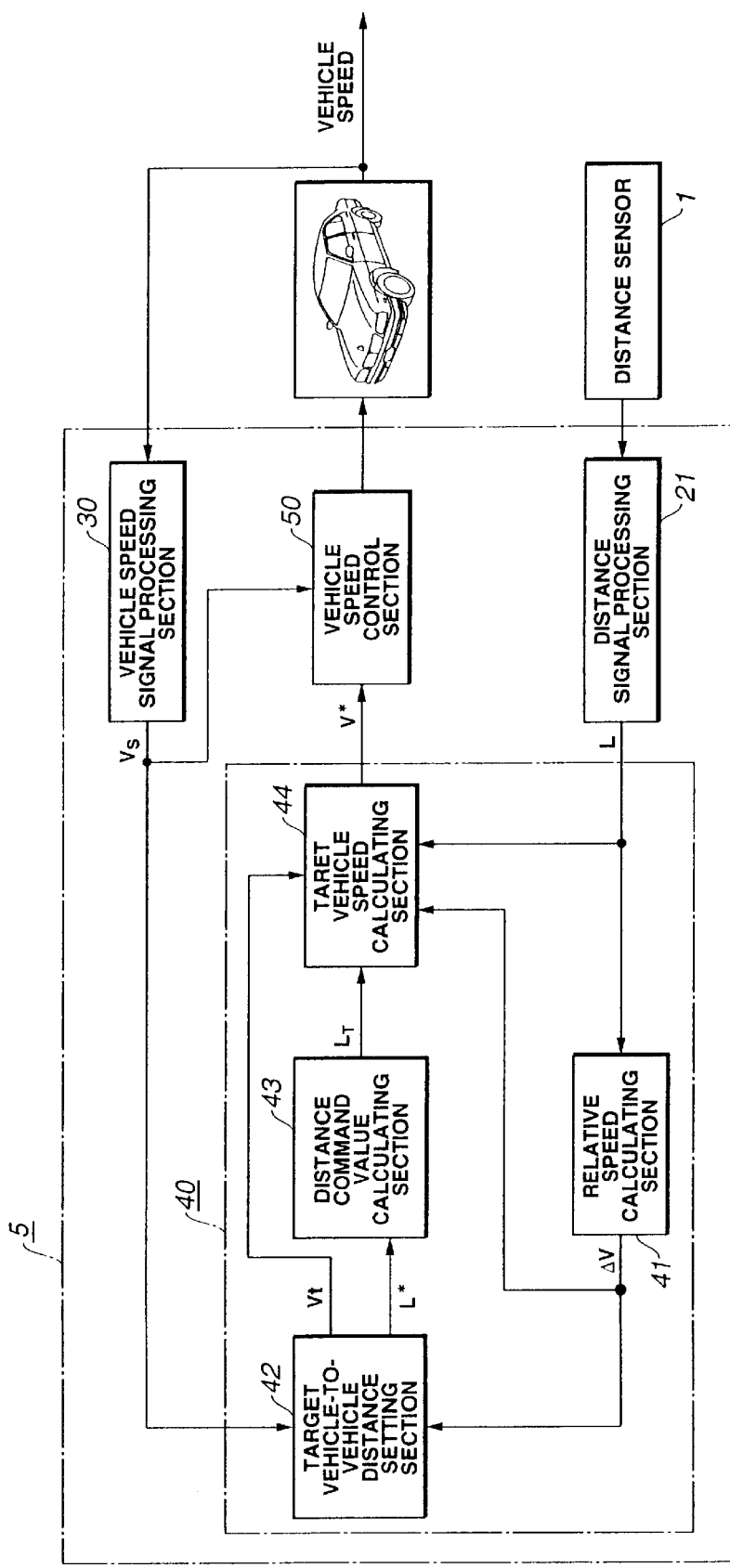
FIG. 2 is a block diagram showing a control system of a follow-up controller of the embodiment.

The follow-up controller 5 comprises a microcomputer and peripheral devices thereof and further comprises a control block in the form of software previously stored therein as shown in FIG. 2. This control block shown in FIG. 2 is constituted by a distance signal processing section 21, a vehicle speed signal processing section 30, a vehicle-to-vehicle distance control section 40 and a vehicle speed control section 50.

The distance signal processing section 21 measures a time period between a first moment that the laser beam is outputted from the vehicle-to-vehicle distance sensor 1 and a second moment that the reflected beam of the preceding vehicle is received. The distance signal processing section 21 calculates a vehicle-to-vehicle distance L between the preceding vehicle and the controlled vehicle 100 on the basis of the measured time period. The vehicle speed signal processing section 30 measures a cycle of a vehicle speed pulse outputted from the vehicle speed sensor 13 and calculates a host vehicle speed Vs of the controlled vehicle 100. The vehicle-to-vehicle distance control section 40 calculates a target vehicle speed V* for maintaining the vehicle-to-vehicle distance L at a target vehicle-to-vehicle distance L, on the basis of the vehicle-to-vehicle distance L calculated in the distance signal processing section 21 and the host vehicle speed Vs calculated in the vehicle speed processing section 30. The vehicle speed control section 50 controls the throttle actuator 3, the automatic transmission 120 and the braking system 130 on the basis of the target vehicle speed V* and a relative speed $\Delta V$ so as to bring the actual vehicle speed V closer to the target vehicle speed V*.

The vehicle-to-vehicle distance control section 40 comprises a relative speed calculating section 41, a target vehicle-to-vehicle distance setting section 42, a distance command value calculating section 43 and a target vehicle speed calculating section 44. The relative speed calculating section 41 calculates the relative speed $\Delta V$ of the controlled vehicle 100 with respect to the preceding vehicle on the basis of the vehicle-to-vehicle distance L inputted from the distance signal processing section 21. The target vehicle-to-vehicle distance setting section 42 calculates the target vehicle-to-vehicle distance L* between the preceding vehicle and the controlled vehicle 100 on the basis of the host vehicle speed Vs inputted from the vehicle speed signal processing section 30. The vehicle-to-vehicle distance command value calculating section 43 calculates a vehicle-to-vehicle distance command value $L_T$ for bringing the actual vehicle-to-vehicle distance L closer to the target vehicle-to-vehicle distance L* on the basis of the relative speed $\Delta V$ and the target vehicle-to-vehicle distance L* and from a norm model employing a damping coefficient $\xi$ and a natural frequency $\omega$. The target vehicle speed calculating section 44 calculates the target vehicle speed V* for bringing the vehicle-to-vehicle distance L closer to the vehicle-to-vehicle distance command value $L_T$, on the basis of the vehicle-to-vehicle distance command value $L_T$ calculated at the vehicle-to-vehicle distance command value calculating section 43.

The relative speed calculating section 41 is constituted by a band-pass filter which is arranged to execute a band-pass filtering process as to the vehicle-to-vehicle distance L. A transfer function of the band-pass filter can be expressed by the equation (1). Since the numerator of the equation (1) includes a differential term of Laplace operator s, the relative speed calculating section 41 practically differentiates the vehicle-to-vehicle distance L to approximately obtain the relative speed $\Delta V$.

$$F(s)=\omega_c^2 s/(s^2+2\zeta\omega_c s+\omega_c^2), \qquad (1)$$

where $\omega_c=2\pi fc$, s is the Laplace operator, and $\zeta_c$ is a damping coefficient.

By employing the band-pass filter, it becomes possible to avoid influence to the vehicle behavior. This influence includes influence of noise and fluctuation during the follow-up control in the case that the relative speed $\Delta V$ is calculated by executing a simple differential calculation from the variation of the vehicle-to-vehicle distance L per time unit. A cutoff frequency $f_c$ in the equation (1) is determined from the magnitude of noise component included in the vehicle-to-vehicle distance L and a fluctuation tolerance of the longitudinal acceleration of the controlled vehicle 100 in a short cycle. Further, it will be understood that a high-pass filter instead of the band-pass filter may be employed for the calculation of the relative speed so as to execute a differential process of the vehicle-to-vehicle distance L through a high-pass filter processing.

The target vehicle-to-vehicle distance setting section 42 calculates the target vehicle-to-vehicle distance L* on the basis of a preceding vehicle speed Vt (=Vs+$\Delta V$) obtained by a time gap $T_0$ between vehicles and from the following equation (2):

$$L^*=Vt \times T_0+L_S, \qquad (2)$$

where the time gap $T_0$ is a time period necessary that the controlled vehicle 100 approaches a predetermined distance L0 behind the preceding vehicle, and $L_S$ is a vehicle-to-vehicle distance at a stopping state.

By employing a time gap between vehicles, it is possible to set the vehicle-to-vehicle distance so that the higher the vehicle speed becomes, the larger the vehicle-to-vehicle distance becomes.

Further, the vehicle-to-vehicle distance command calculating section 43 calculates a vehicle-to-vehicle distance command value $L_T$ on the basis of the vehicle-to-vehicle distance L and the target vehicle-to-vehicle distance L*. The vehicle-to-vehicle distance command value $L_T$ is a command value for executing a follow-up traveling of the controlled vehicle 100 while keeping the vehicle-to-vehicle distance L at the target distance L*. More specifically, the vehicle-to-vehicle distance command value $L_T$ is calculated by executing a low-pass filter treatment of a second-order lag with respect to the target vehicle-to-vehicle distance L*. The low-pass filter treatment of a second-order lag is executed by employing a norm model $G_T(s)$ expressed by the following equation (3) using the damping coefficient $\zeta$ and the natural frequency $\omega$ determined for setting a response characteristic in the vehicle-to-vehicle distance control system at a target response characteristic:

$$G_T(s) = \frac{\omega_n^2}{(s^2 + 2\zeta\omega_n s + \omega_n)}, \qquad (3)$$

where it is preferable that the damping coefficient $\zeta$ and the nature frequency $\omega$ are scheduled by the relative vehicle speed $\Delta V$ and the vehicle-to-vehicle distance difference $\Delta L$ obtained by subtracting the target vehicle-to-vehicle distance L* from the actual vehicle-to-vehicle distance L so that the response characteristic is changed according to the condition of the follow-up travel including a cut-in of the preceding vehicle, a cut-off of the preceding vehicle and approaching to the preceding vehicle.

Furthermore, the target vehicle speed calculating section 44 calculates a target vehicle speed V* on the basis of the vehicle-to-vehicle speed command value $L_T$ and by using the feedback compensator. More specifically, the target vehicle speed V* is calculated by subtracting a linear combination of a product of a difference ($L_T$–L) and a distance control gain fd and a product of the relative speed ΔV and a speed control gain fv from the preceding vehicle speed Vt as expressed by the following equation (4):

$$V^* = Vt - \{fd(L_T - L) + fv \cdot \Delta V\}. \tag{4}$$

Figure 3:
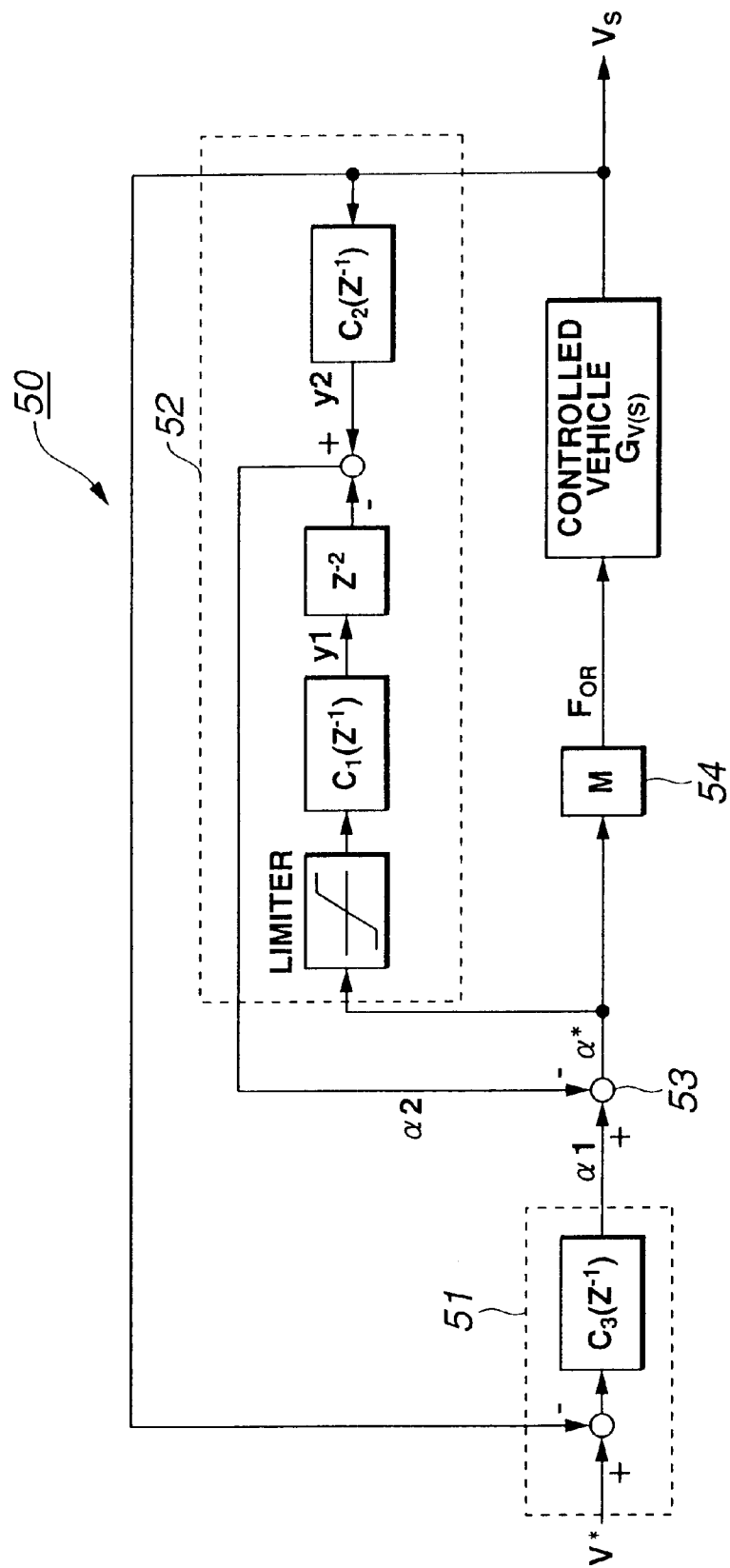
FIG. 3 is a block diagram showing a detailed construction of a vehicle speed control section of FIG. 2.

The vehicle speed control section 50 controls the opening of the throttle valve through the control of the throttle actuator 3, the transmission ratio of the automatic transmission 120 and the baking force of the braking system 130 so as to bring the host vehicle speed Vs closer to the target vehicle speed V*. That is, the vehicle speed control section 50 is designed by the robust matching control method as shown in FIG. 3 so as to be a servo system which functions strongly (durably) against disturbance including a fluctuation of a road slope. Assuming that the transfer characteristic of the controlled object in this servo system is a pulse transfer function $P(z^{-1})$, each compensator of this servo system is represented as shown in FIG. 3, where z is a time lag operator, and z–1 is the time-lag operator at a one sampling-cycle previous time. The servo system of FIG. 3 comprises a model matching compensator 51, a robust compensator 52, a subtracter 53 and a multiplier 54. The robust compensator 52 functions as a disturbance compensator. The subtracter 53 calculates a target acceleration/deceleration (target acceleration) α* by subtracting the disturbance estimate α2 of the robust compensator 52 from the acceleration command value α2 of the model matching compensator 51. The multiplier 54 calculates a target driving/braking force $F_{OR}$ by multiplying the target acceleration/deceleration (target driving force) α* by a vehicle weight M of the controlled vehicle 100.

The model matching compensator 51 is arranged such that the response characteristic of the controlled object having an input of the target vehicle speed V* and the output of the actual vehicle speed V corresponds to the characteristic of the norm model $H(z^{-1})$ having previously-set first-order lag and dead-time. By setting a part having an input of the target acceleration/deceleration α* and an output of the actual host vehicle speed Vs as a controlled object, the pulse transfer function is expressed by a product of an integral element $P1(z^{-1})$ expressed by the equation (5) and a dead-time element $P2(z^{-1}) = z^{-2}$, where T is a sampling cycle.

$$P1(z^{-1}) = T \cdot z^{-1}/(1 - z^{-1}) \tag{5}$$

Compensators $C1(z^{-1})$ and $C2(z^{-1})$ of the robust compensator 52 are expressed by the following equations (6) and (7), respectively:

$$C1(z^{-1}) = (1-\gamma) \cdot z^{-1}/(1 - \gamma \cdot z^{-1}), \tag{6}$$

$$C2(z^{-1}) = (1-\gamma) \cdot (1 - z^{-1})/T \cdot (1 - \gamma \cdot z^{-1}), \tag{7}$$

where $\gamma = \exp(-T/Tb)$.

By neglecting the dead-time of the controlled object and setting a first-order low-pass filter having a time constant Ta as a norm model, a feedback compensator C3 of the model matching compensator 51 is expressed by a constant as shown by the following equation (8):

$$C3 = K = \{1 - \exp(-T/Ta)\}/T. \tag{8}$$

Figure 4:
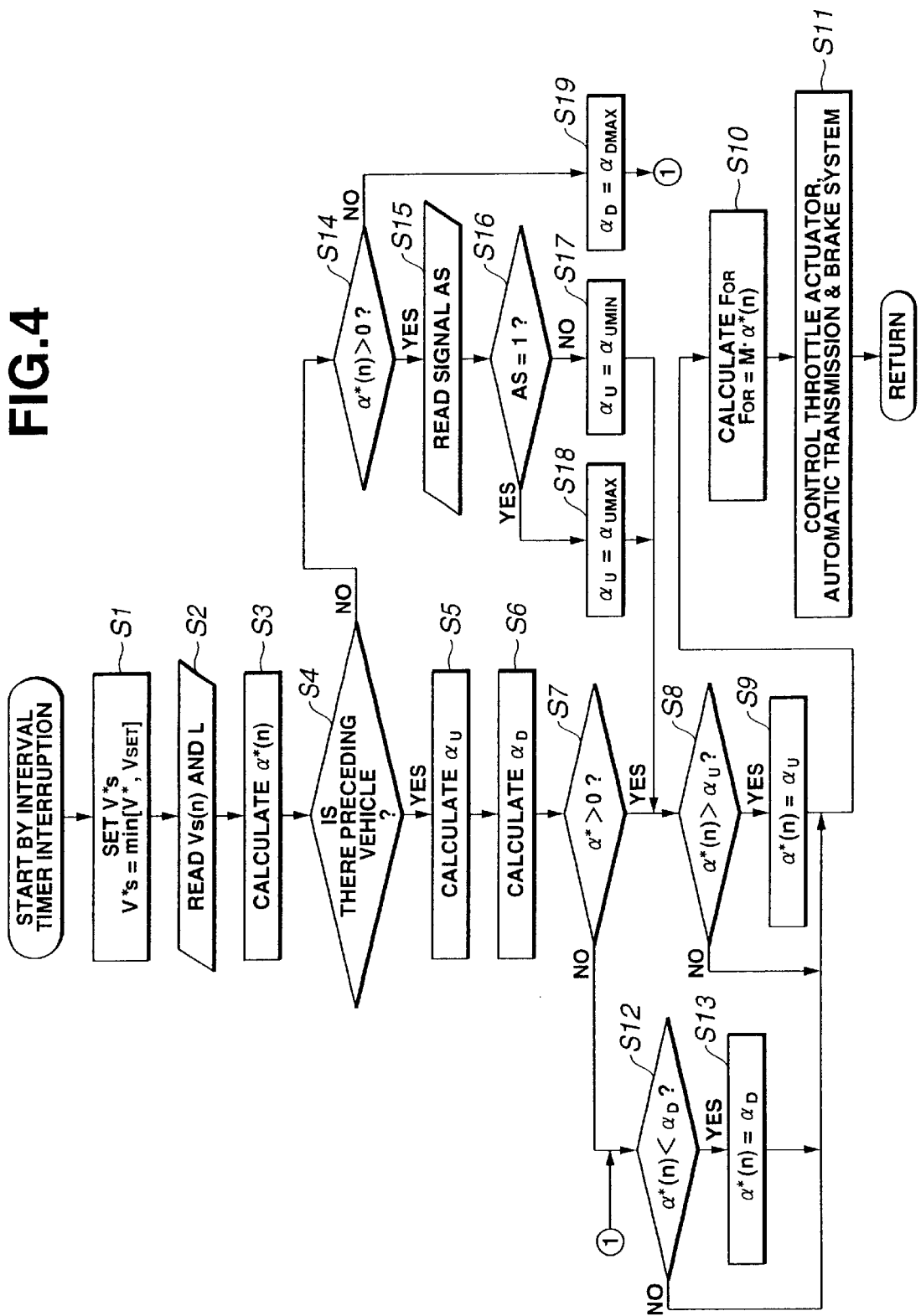
FIG. 4 is a flowchart showing a vehicle speed control process executed by the vehicle speed control section.

The vehicle speed control section 50 executes the vehicle speed control process shown in FIG. 4 at a predetermined sampling cycle (10 msec) as a timer interruption process of a predetermined main program.

At a step S1, the follow-up controller 5 reads the target vehicle speed V* calculated at the vehicle-to-vehicle distance control section 40 and a set vehicle speed $V_{SET}$ set by a driver. Further, the follow-up controller 5 set a smaller one of the target vehicle V* and the set vehicle speed $V_{SET}$ as a selected target vehicle speed V*s.

At a step S2, the follow-up controller 5 reads the host vehicle speed Vs(n) and the actual vehicle-to-vehicle distance L(n).

At a step S3, the follow-up controller 5 calculates the compensator outputs y1(n) and y2(n) by executing the calculation of the equations (9) and (10) corresponding to the compensators $C1(z^{-1})$ and $C2(z^{-1})$ of the model matching compensator 52, respectively, and calculates the compensator output α1 by executing the calculation of the following equation (11) corresponding to the model matching compensator 51 on the basis of the selected target vehicle speed V*s and the host vehicle speed Vs. Further, the follow-up controller 5 calculates the target acceleration/deceleration α* by executing the calculation of the following equation (12) on the basis of the compensator outputs y1(n), y2(n) and α1. The follow-up controller 5 updates the target acceleration/deceleration α*(n) by the calculated target acceleration/deceleration α* and stores it in a storage region of the present value of the target acceleration/deceleration. Further, the follow-up controller 5 updates the previous target acceleration/deceleration α*(n–1) and stores it in a storage region of the previous value of the target acceleration/deceleration.

$$y1(n) = \gamma \cdot y1(n-1) + (1-\gamma) \cdot \alpha (n-1) \tag{9}$$

$$y2(n) = \gamma \cdot y2(n-1) + (1-\gamma)/T \cdot Vs(n) - (1-\gamma)/T \cdot Vs(n-1) \tag{10}$$

$$\alpha 1(n) = K \cdot (V^*s(n) - Vs(n)) \tag{11}$$

$$\alpha^* = \alpha 1(n) + y1(n) - y2(n) \tag{12}$$

At a step S4, the follow-up controller 5 decides whether there is a preceding vehicle or not. More specifically, the follow-up controller 5 decides on the basis of the signal indicative of the actual vehicle-to-vehicle distance L from the vehicle-to-vehicle distance sensor 1 whether or not the actual vehicle-to-vehicle distance L is smaller than or equal to a threshold $L_{TH}$ for deciding the existence of a preceding vehicle. When the decision at the step S4 is affirmative ($L \leq L_{TH}$), the routine proceeds to a step S5. When the decision at the step S4 is negative, the routine proceeds to a step S14.

Figure 5:
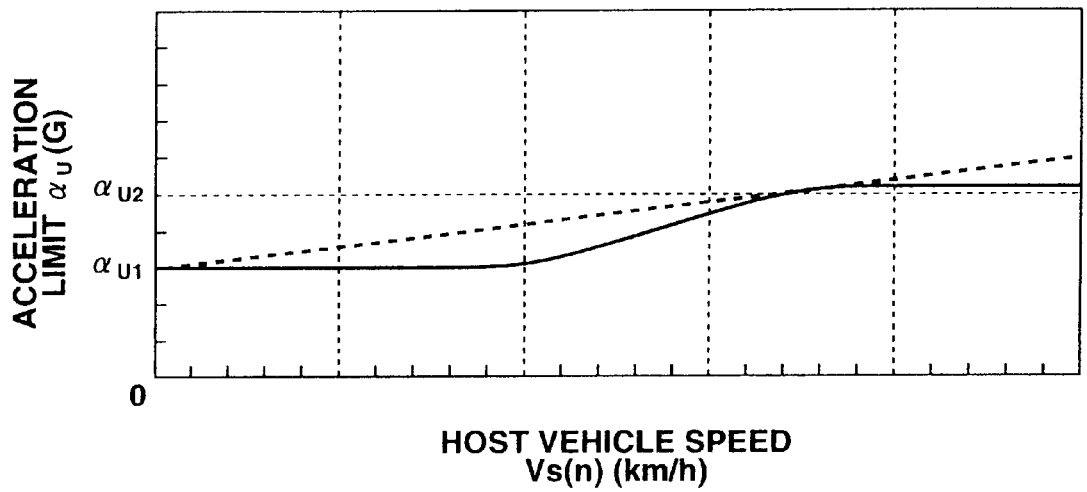
FIG. 5 is a graph showing a relationship between a host vehicle speed and an acceleration limit.

At a step S5, the follow-up controller 5 calculates an acceleration limit $\alpha_U$ from the host vehicle speed Vs(n) and mapped data corresponding to an acceleration limit map of FIG. 5. The follow-up controller 5 updates the present acceleration limit and stores it in a storage region of the acceleration limit. As shown in FIG. 5, the acceleration limit $\alpha_U$, which is shown by a continuous line, is set at a first predetermined value $\alpha_{U1}$ when the vehicle speed Vs(n) is in a low speed range, and the acceleration limit $\alpha_U$ is set at a second predetermined value $\alpha_{U2}$ when the vehicle speed Vs(n) is in a high speed range. Further, when the vehicle speed Vs(n) is in an intermediate speed range, the acceleration limit $\alpha_U$ is set so as to gradually increase according to the increase of the vehicle speed Vs(n).

Figure 6:
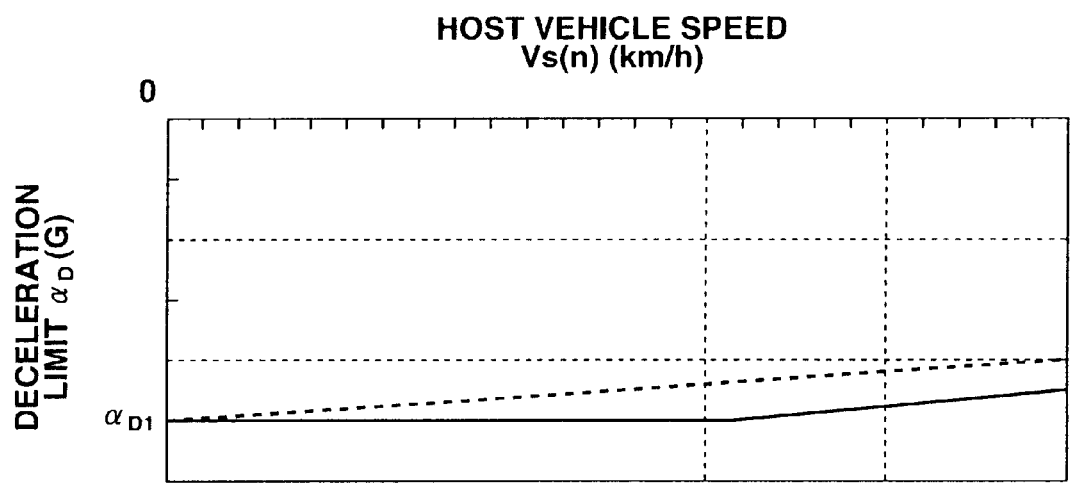
FIG. 6 is a graph showing a relationship between the host vehicle speed and a deceleration limit.

At a step S6, the follow-up controller 5 calculates a deceleration limit $\alpha_D$ from the host vehicle speed Vs(n) and mapped data corresponding to a deceleration limit map of FIG. 6. The follow-up controller 5 updates the present deceleration limit and stores it in a storage region of the deceleration limit. As shown in FIG. 6, the deceleration limit $\alpha_D$, which is shown by a continuous line, is set at a third predetermined value $\alpha_{D1}$ when the vehicle speed Vs(n) is in low or intermediate speed range. When the vehicle speed Vs(n) is in a high speed range, the deceleration limit $\alpha_D$ is set so as to gradually increase according to the increase of the vehicle speed Vs(n).

At a step S7, the follow-up controller 5 decides whether or not there is a demand of the acceleration. More specifically, the follow-up controller 5 decides whether the target acceleration/deceleration $\alpha^*(n)$ stored in the storage region of the present target acceleration/deceleration is positive or not. When the decision at the step S7 is affirmative ($\alpha^*(n)>0$), the routine proceeds to a step S8. When the decision at the step S7 is negative, the routine proceeds to a step S12.

At the step S8, the follow-up controller 5 decides whether or not the target acceleration/deceleration $\alpha^*$ is greater than the acceleration limit $\alpha_U$. When the decision at the step S8 is affirmative ($\alpha^*>\alpha_U$), the routine proceeds to a step S9 wherein the follow-up controller 5 updates the acceleration limit $\alpha_U$ and stores it in the storage region of the target acceleration/deceleration as a present target acceleration/deceleration $\alpha^*(n)$ ($\alpha^*(n)=\alpha_U$). When the decision at the step S8 is negative, the routine jumps to the step S10.

At a step S10 following to the execution of the step S9, the follow-up controller 5 calculates a target driving/braking force $F_{OR}$ ($F_{OR}=M\cdot\alpha^*(n)$) by multiplying the vehicle weight M and the target acceleration/deceleration $\alpha^*(n)$.

At a step S11, the follow-up controller 5 controls the throttle actuator 3 for controlling the throttle valve opening, the automatic transmission 120 and the braking system 130 on the basis of the target driving/braking force $F_{OR}$ so as to bring the host vehicle speed Vs closer to the target vehicle speed V*. Thereafter, the routine proceeds to a return step to terminate the present routine and to return the main program.

At the step S12 following to the negative decision ($\alpha \leq 0$) at the step S7, the follow-up controller 5 decides whether or not the present target acceleration/deceleration $\alpha^*(n)$ stored in the storage region of the present target acceleration/ deceleration is smaller than the deceleration limit $\alpha_D$ stored in the storage region of the deceleration limit. When the decision at the step S12 is affirmative ($\alpha^*(n)<\alpha_D$), the routine proceeds to a step S13 wherein the follow-up controller 5 updates the target acceleration/deceleration $\alpha^*(n)$ with the deceleration limit $\alpha_D$ stored ($\alpha^*(n)=\alpha_D$), and stores it in the storage region of the present target acceleration/ deceleration. Following to the execution of the step S13, the routine proceeds to the step S10. When the decision at the step S12 is negative, the routine directly jumps to the step S10.

At the step S14 following to the negative decision ($L>L_{TH}$) at the step S4, the follow-up controller 5 decides whether or not there is a demand of the acceleration, as is similar to the step S7.

When the decision at the step S14 is affirmative ($\alpha^*(n)>0$), the routine proceeds to a step S15 wherein the follow-up controller 5 reads the signal SA of the acceleration demand switch 4. Following to the execution of the step S15, the routine proceeds to a step S16 wherein the follow-up controller 5 decides whether the signal AS is set at a logic value "1" or not. When the decision at the step S16 is negative (AS=0), the routine proceeds to a step S17 wherein the follow-up controller 5 updates the acceleration limit $\alpha_U$ with a minimum acceleration limit $\alpha_{UMLIN}$ ($\alpha_U=\alpha_{UMIN}$) and stores it in the storage region of the acceleration limit. Following to the execution of the step S17, the routine jumps to the step S8. When the decision at the step S16 is affirmative (AS=1), the routine proceeds to a step S18 wherein the follow-up controller 5 updates the acceleration limit $\alpha_U$ with a maximum acceleration limit $\alpha_{UMAX}$ ($\alpha_U=\alpha_{UMAX}$) and stores it in the storage region of the acceleration limit. Following to the execution of the step S18, the routine jumps to the step S8.

When the decision at the step S14 is negative ($\alpha^*(n) \leq 0$), the routine proceeds to a step S19 wherein the follow-up controller 5 updates the deceleration limit $\alpha_D$ with a maximum deceleration limit $\alpha_{DMAX}$, which is slightly larger than a minimum value (smallest absolute value) in the map shown in FIG. 6, and stores it in the storage region of the deceleration limit. Following to the execution of the step S19, the routine jumps to the step S12.

In the vehicle speed control process shown in FIG. 3, the process of the steps S1 to S3 corresponds to a target acceleration calculating means, the process of the step S4 corresponds to a preceding vehicle recognition means, the process of the steps S5 to S9, S12 and S13 corresponds to a target acceleration limiting means, the process of the steps S14 to S17 corresponds to an acceleration limiting means, and the process of the S14 to S16 and S18 corresponds to a acceleration limit increasing means.

With reference to FIGS. 7A to 7C, the manner of operation of the embodiment according to the present invention will be discussed hereinafter.

Assuming that at a moment t0 the controlled vehicle 100 travels straightly on a city road and follows up a preceding vehicle traveling at a constant vehicle speed lower than the set vehicle speed $V_{SET}$ while keeping the target vehicle-to-vehicle distance L* as shown in FIG. 7A, the actual vehicle-to-vehicle distance L detected by the vehicle-to-vehicle distance sensor 1 is brought closer to the target vehicle-to-vehicle distance L* at the moment t0 as shown in FIG. 7B. Since the preceding vehicle travels at the constant vehicle speed, the vehicle-to-vehicle distance command value L* generally corresponds to the actual vehicle-to-vehicle distance L. Accordingly, the relative speed $\Delta V$ calculated at the relative speed calculating section 41 of the vehicle-to-vehicle distance control section 40 becomes about zero ($\Delta V=0$), and the target vehicle speed V* generally becomes equal to the vehicle speed Vt of the preceding vehicle. Further, since the target vehicle speed V* is smaller than the set vehicle speed $V_{SET}$ set by the driver of the controlled vehicle 100, the target vehicle speed V* is set as the selected target vehicle speed V*s.

Under this constant traveling condition, if the preceding vehicle quickly increases its vehicle speed at a moment t1, the actual vehicle-to-vehicle distance L detected by the vehicle-to-vehicle distance sensor 1 also quickly increases. The relative speed $\Delta V$ calculated at the relative speed calculating section 31 also quickly increases in the positive direction, and therefore the target vehicle-to-vehicle distance L* calculated at the target vehicle-to-vehicle distance calculating section 42 increases. Accordingly, the vehicle-to-vehicle distance command value $L_T$ calculated at the distance command value calculating section 43 increases, and the target vehicle speed V* calculated at the target vehicle speed calculating section 44 quickly increases as shown by a chain line of FIG. 7A.

In the vehicle speed control process executed by the vehicle speed control section 50, the target acceleration/ deceleration α* calculated at the step S3 increases in the positive direction according to the increase of the selected target vehicle speed V*s as shown in FIG. 7C. At this acceleration increasing period, since the follow-up control is being executed, the routine proceeds from the step S4 to the step S5 wherein the acceleration limit $\alpha_U$ is set at a small value as shown by a dot and dash line in FIG. 7C since the host vehicle speed Vs(n) is in a low speed range.

During a period to a moment t2, since the target acceleration/deceleration α* is smaller than the acceleration limit $\alpha_U$, the routine of the vehicle speed control process directly proceeds to the step S10 wherein the follow-up controller 5 calculates the target driving/braking force $F_{OR}$ on from the target acceleration/deceleration α*. Then, the routine proceeds to the step S11 wherein the throttle actuator 3 is controlled on the basis of the target driving/braking force $F_{OR}$, and therefore the host vehicle speed Vs is increased.

Thereafter, at the moment t2 the target acceleration/deceleration α* becomes greater than the acceleration limit $\alpha_U$, and therefore the decision at the step S8 becomes affirmative and the routine proceeds to the step S9. At the step S9, the target acceleration/deceleration α* is limited at the acceleration limit $\alpha_U$. Accordingly, the increase of the host vehicle speed Vs is suppressed as compared with the increase of the target vehicle speed V*, as shown by a continuous line in FIG. 7A. Consequently; the actual vehicle-to-vehicle distance L is kept at a value greater than the target vehicle-to-vehicle distance L* as shown in FIG. 7B.

Then, the preceding vehicle is put in a constant speed condition at a moment t3, and the host vehicle speed Vs becomes greater than the vehicle speed of the preceding vehicle at a moment t4. Accordingly, the actual vehicle-to-vehicle distance L decreases from the moment t4, and the target acceleration/deceleration α* calculated at the step S3 starts decreasing.

At a moment t5 when the target acceleration/deceleration α* becomes smaller than the acceleration limit $\alpha_U$, the routine of the vehicle speed control process of FIG. 4 proceeds from the step S8 to the step S10 wherein the target driving/braking force $F_{OR}$ is calculated on the basis of the target acceleration/deceleration α* calculated at the step S3. Then, the increase of the host vehicle speed Vs is saturated, and the host vehicle speed Vs becomes greater than the target vehicle speed V* at a moment t6. That is, the target acceleration/deceleration α* takes a negative value nearly equal to zero to gradually decrease the host vehicle speed Vs. Thereafter, at a moment t7 the vehicle-to-vehicle distance L is brought closer to the target vehicle-to-vehicle distance L*, so that the controlled vehicle 100 travels at a constant speed traveling condition having a vehicle speed as same as that of the preceding vehicle.

As described above, in the case that the controlled vehicle 100 travels at a low speed range, the acceleration limit $\alpha_U$ calculated at the step S5 with reference to the mapped data in the vehicle speed control process is kept at a constant value regardless the change of the host vehicle speed Vs. Therefore, the target acceleration/deceleration α* is limited by the acceleration limit $\alpha_U$, and the stable acceleration condition is ensured without generating the change of the acceleration.

Thereafter, at a moment t8 when the preceding vehicle is quickly braked to stop in response to the external condition such as a stop indication of a traffic signal, the vehicle-to-vehicle distance L to the preceding vehicle is quickly decreased. Accordingly, the target acceleration/deceleration α* calculated at the step S3 of the vehicle speed control process shown in FIG. 4 is radically varied into the negative direction as shown in FIG. 7C. Since the controlled vehicle 100 travels at the low speed range, the deceleration limit $\alpha_D$ calculated at the step S6 takes a small value (a large absolute value). Therefore, it is permitted to take a large deceleration. Further, the target driving/braking force $F_{OR}$ calculated at the step S10 also takes a negative value, and therefore large braking force is generated by the operation of the braking system 130 to quickly decrease the host vehicle speed Vs according to the deceleration of the preceding vehicle. Consequently, the controlled vehicle 100 is put in the stop condition while keeping the predetermined vehicle-to-vehicle distance L. Similarly, in the case that a preceding vehicle cuts in the forward of the controlled vehicle 100 traveling in the low speed range, that is, cuts in the same lane of the controlled vehicle with a short distance, the vehicle speed of the controlled vehicle 100 is largely decelerated to ensure a safety vehicle-to-vehicle distance.

On the other hand, in the case that the vehicle speed of a preceding vehicle is quickly accelerated under that condition that the controlled vehicle 100 follows up the preceding vehicle on a highway at a high speed so as to bring the actual vehicle-to-vehicle distance L closer to the target vehicle distance L*, the acceleration limit $\alpha_U$ calculated at the step S5 of the vehicle speed control process shown in FIG. 4 is set at the predetermined value $\alpha_{U2}$ which is a large value as shown by a two-dot chain line of FIG. 7C. Accordingly, by slightly limiting the target acceleration/deceleration α* calculated at the step S3, the controlled vehicle 100 can follow up the preceding vehicle accelerated. This enables the driver to ensure the acceleration feeling fitted with the drive feeling.

Similarly, in the case that a preceding vehicle decreases its vehicle speed or another vehicle cuts in the forward of the controlled vehicle 100 during a follow-up traveling at a high speed range, the deceleration limit $\alpha_D$ calculated at the step S4 of the vehicle speed control process shown in FIG. 4 takes a large value (a small absolute value) as compared with that in the case of the low speed range. However, this deceleration limit $\alpha_D$ is sufficiently small and does not limit the target acceleration α* in negative value. For example, even if the vehicle speed of the controlled vehicle 100 is radically decelerated in reply to a condition that the preceding vehicle approaches an end of a traffic backup, the host vehicle speed Vs is decelerated in response to the deceleration of the preceding vehicle. During this period, if the target acceleration/deceleration α* calculated at the step S3 takes a value smaller than the deceleration limit $\alpha_D$ in reply to the quick deceleration of the preceding vehicle, the target acceleration/deceleration α* is limited by the deceleration limit $\alpha_D$. However, the deceleration limit $\alpha_D$ is gradually decreased according to the decrease of the host vehicle speed Vs. This gradually loosens the limit of the target acceleration/deceleration α*, and changes the traveling condition of the controlled vehicle 100 to a decelerating condition for following up the decelerating preceding vehicle.

Further, in the case that the controlled vehicle 100, which follows up a preceding vehicle on a highway at high speed, decreases its vehicle speed Vs to a low speed range in response to the deceleration of the preceding vehicle, and then the preceding vehicle starts accelerating, the acceleration limit $\alpha_U$ in a low speed range of the controlled vehicle 100 is limited at a small value. Then, when the host vehicle speed Vs is put in the intermediate speed range, the acceleration limit $\alpha_U$ increases according to the increase of the host vehicle speed Vs, and therefore the limit of the target acceleration/deceleration α* is gradually loosened. Accordingly, the gradual increase of the acceleration enables an optimum acceleration control fitted with the feeling of the driver.

Further, in the case that the vehicle-to-vehicle distance sensor 1 of the controlled vehicle 100 cannot detect a preceding vehicle due to a cornering travel of the preceding vehicle under a condition that the controlled vehicle 100 travels on a city road at a low speed range, the target vehicle speed V* calculated at the target vehicle speed calculating section 44 of the vehicle-to-vehicle distance control section 40 becomes greater than the set vehicle speed $V_{SET}$ set by the driver. That is, at the step S1 of the vehicle speed control process shown in FIG. 4, the set vehicle speed $V_{SET}$ is set as the selected target vehicle speed V*s. Although the target acceleration/deceleration α*(n) calculated at the step S3 takes a positive large value, the decision at the step S4 is negative since the preceding vehicle is not detected. Therefore, the routine proceeds to the step S14 wherein it is decided that the target acceleration/deceleration α*(n) is positive. Then, the routine proceeds to the step S15 wherein the switch signal AS is read in the follow-up controller 5. Further, at the step S16, the follow-up controller 5 decides whether the logic value of the switch signal AS is set at "1" or not. At this timing, the driver recognizes that the follow-up system cannot detect the preceding vehicle due to cornering. Therefore, the driver does not operate the acceleration demand switch 4. That is, since the logic value of the switch signal AS is set at "0", the routine proceeds to the step S17 wherein the acceleration limit $α_U$ is set at the minimum value $α_{UMIN}$ of the mapped data corresponding to the graph shown in FIG. 5. Accordingly, the acceleration of the controlled vehicle 100 is relatively slow since the target acceleration/deceleration α* is limited by the minimum value $α_{UMIN}$. Thereafter, when the controlled vehicle 100 again detects the preceding vehicle after cornering, the target acceleration/deceleration α*(n) takes the small value according to the actual vehicle-to-vehicle distance L, and the controlled vehicle 100 again starts following-up of the preceding vehicle.

On the other hand, when the controlled vehicle 100 traveling on a straight road is put in a preceding vehicle undetected condition by a lane change of the preceding vehicle and when the driver's demand is to quickly increase the vehicle speed to the set vehicle speed $V_{SET}$ set by the driver, the acceleration demand switch 4 is operated and therefore the logic value of the switch signal AS is set at "1". Therefore, the routine of FIG. 4 proceeds from the step S16 to the step S18 wherein the acceleration limit $α_U$ is set at the acceleration limit $α_{UMAX}$ which is slightly greater than the maximum value in the mapped data corresponding to the acceleration limit map of FIG. 5. Consequently, the limiting of the target acceleration/deceleration α* calculated at the step S3 is suppressed, and therefore the controlled vehicle 100 can perform desired acceleration according to the driver's demand.

Even under a high speed traveling condition of the controlled vehicle 100, the acceleration control is executes as is similar to the above described case. That is, under the high speed traveling condition, the acceleration limit $α_U$ is set at a large value, and the acceleration demand of the driver is rarely generated. However, in the case that the driver demands to accelerate the controlled vehicle 100, by operating the acceleration demand switch 4, the acceleration limit $α_U$ is increased to satisfy the demand of the driver.

Thereafter, when the host vehicle speed Vs reaches the set vehicle speed $V_{SET}$, the target acceleration/deceleration α* is set at a small value varied between negative and positive so as to keep the set vehicle speed $V_{SET}$. If the target acceleration/deceleration α* takes zero or negative value, the routine of FIG. 4 proceeds from the step S14 to the step S19 wherein the deceleration limit $α_D$ is set at the minimum value $α_{DMIN}$. However, since the target acceleration/deceleration α* is generally zero, it is not limited by the deceleration limit $α_D$. Consequently, the acceleration control for keeping the set vehicle speed $V_{SET}$ is executed by controlling the throttle actuator 3.

With the thus arranged follow-up control system according to the present invention, the target acceleration/deceleration α* is calculated so as to bring the host vehicle speed Vs to the target vehicle speed V* for the purpose of bringing the actual vehicle-to-vehicle distance L closer to the target vehicle-to-vehicle distance L*. When the follow-up control system executes the acceleration control by controlling the throttle actuator 3, the automatic transmission 120 and the braking system 130, the follow-up control system limits the target acceleration/deceleration α* according to the host vehicle speed Vs. Therefore, it becomes possible to execute the optimum acceleration control according to the vehicle traveling condition without impressing a strange feeling to the driver.

Further, when the follow-up condition is changed from a preceding vehicle detected condition to an undetected condition, the acceleration limit $α_U$ is set at a small value. This enables suppressing the inadvertent acceleration in a condition that the follow-up is suddenly and temporally stopped by the cornering operation of the preceding vehicle. Further, only when the driver demands the acceleration of the controlled vehicle 100 through the operation of the acceleration demand switch 4, the quick acceleration is allowed. This enables the optimum acceleration control according to the drive feeling of the driver.

Although the embodiment according to the present invention has been shown and described such that at the step S5 in the vehicle speed control process shown in FIG. 4, the acceleration limit $α_U$ is calculated with reference to the mapped data corresponding to the acceleration limit map shown in FIG. 5, it will be understood that the calculation of the acceleration limit $α_U$ in the present invention is not limited to this method and may be calculated from an equation representative of an approximated line which increases according to the increase of the host vehicle speed Vs, as shown by a dotted line shown in FIG. 5. This dotted line will be expressed by an equation $α_U = k_1 + k_2 \times Vs$, where $k_1$ and $k_2$ are constants. Similarly, it will be understood that the calculation of the deceleration limit in the present invention may be calculated from an equation representative of an approximated line which increases according to the increase of the host vehicle speed Vs, as shown by a dotted line shown in FIG. 6, instead of the calculation of the deceleration limit $α_D$ with reference to the mapped data corresponding to the deceleration limit map shown in FIG. 6. This dotted line will be expressed by an equation $α_D = k_3 + k_4 \times Vs$, where $k_3$ and $k_4$ are constants.

Although the embodiment according to the present invention has been shown and described such that both of the acceleration limit $α_U$ and the deceleration limit $α_D$ are varied according to the host vehicle speed Vs, it will be understood that the present invention is not limited to this and may be arranged such that only the acceleration limit $α_U$ is varied according to the host vehicle speed Vs and the deceleration limit $α_D$ is set at a constant value.

Further, although the embodiment according to the present invention has been shown and described such that the target vehicle-to-vehicle distance L* is calculated on the basis of the preceding vehicle speed Vt, it will be understood that the present invention is not limited to this and may be arranged to employ the host vehicle speed Vs instead of the preceding vehicle speed Vt. Furthermore, although the embodiment according to the present invention has been shown and described such that the target acceleration/deceleration is directly limited, it will be understood that the present invention is not limited to this and may be arranged to limit the target driving/braking force $F_{OR}$, the throttle opening varied by the throttle actuator 3 and the braking force of the braking system 130.

While the embodiment according to the present invention has been shown and described such that the follow-up controller 5 executes the vehicle speed control process through the execution of a software, it will be understood that the present invention is not limited to this and may be arranged to employ a hardware constituted by an electronic circuit including a function generator, a comparator, a computing element and so on. Further, although the embodiment according to the present invention has been shown and described to be applied to a rear-wheel drive vehicle, this may be applied to a front-wheel drive vehicle. In addition, although the embodiment according to the present invention has been shown and described to employ the engine 110 as a rotation drive source, it will understood that the present invention is not limited to this and may employ an electric motor, and may be applied to a hybrid vehicle employing an engine and an electric motor.

The entire contents of Japanese Patent Application No. 11-168263 filed on Jun. 15, 1999 in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A preceding vehicle follow-up control system for a vehicle, comprising:
   a vehicle-to-vehicle distance detector that detects a distance between a controlled vehicle and a preceding vehicle and outputs a signal indicative of the vehicle-to-vehicle distance;
   a vehicle speed detector that detects a vehicle speed of the controlled vehicle and outputs a signal indicative of the vehicle speed; and
   a controller connected to said vehicle-to-vehicle distance detector and said vehicle speed sensor, said controller comprising a vehicle-to-vehicle distance controlling section and a vehicle speed controlling section,
   the vehicle-to-vehicle distance controlling section calculating a target vehicle speed for bringing the vehicle-to-vehicle distance closer to a target vehicle-to-vehicle distance, on the basis of the vehicle-to-vehicle distance and the vehicle speed,
   the vehicle speed controlling section controlling driving force of the controlled vehicle at a target driving force so as to bring the controlled-vehicle speed closer to the target vehicle speed, the vehicle speed controlling section calculating a target acceleration for the target driving force on the basis of the target vehicle speed, and limiting the target acceleration according to the controlled-vehicle speed.

2. The preceding vehicle follow-up control system as claimed in claim 1, wherein the vehicle speed controlling section of said controller is further arranged to limit the target acceleration so as to be smaller than a predetermined acceleration when the vehicle speed is in a low speed range and to allow the target acceleration to take a second predetermined acceleration greater than the predetermined acceleration when the vehicle speed is in a high speed range.

3. The preceding vehicle follow-up control system as claimed in claim 1, wherein the vehicle speed controlling section of said controller is further arranged to limit the target acceleration so as to be greater than a predetermined deceleration when the vehicle speed is in a high speed range, and to allow the target acceleration to take a second deceleration smaller than the predetermined deceleration when the vehicle speed is in a low speed range.

4. The preceding vehicle follow-up control system as claimed in claim 1, wherein the vehicle speed controlling section of said controller is further arranged to decide whether the preceding vehicle is detected, to limit the target acceleration according to the controlled-vehicle speed when the preceding vehicle is detected, to limit the target acceleration so as to be smaller than an acceleration limit when the decision as to the detection of the preceding vehicle is changed from a detected state to an undetected state and when the controlled vehicle is put in an accelerated condition.

5. The preceding vehicle follow-up control system as claimed in claim 4, wherein the vehicle speed controlling section of said controller is further arranged to increase the acceleration limit according to a demand of a driver of the controlled vehicle.

6. The preceding vehicle follow-up control system as claimed in claim 2, wherein the vehicle speed controlling section of said controller is further arranged to set the target acceleration at a constant value regardless the vehicle speed when the vehicle speed is in the low speed range.

7. The preceding vehicle follow-up control system as claimed in claim 1, wherein the vehicle-to-vehicle distance controlling section of said controller calculates a relative speed which is a difference between a vehicle speed of the preceding vehicle and the controlled-vehicle speed.

8. The preceding vehicle follow-up control system as claimed in claim 1, wherein the target acceleration is limited so as to be within a range ranging from a deceleration limit to an acceleration limit.

9. The preceding vehicle follow-up control system as claimed in claim 8, wherein the acceleration limit takes a first constant value when the controlled-vehicle speed is in a low speed range, increases according to an increase of the controlled-vehicle speed when the controlled-vehicle speed is in an intermediate speed range, and takes a second constant value greater than the first constant value when the controlled-vehicle speed is in a high speed range.

10. The preceding vehicle follow-up control system as claimed in claim 8, where the acceleration limit linearly increases according to an increase of the controlled-vehicle speed.

11. The preceding vehicle follow-up control system as claimed in claim 8, wherein the deceleration limit takes a third constant value when the controlled-vehicle speed is in a low or intermediate speed range, and linearly approaches zero according to an increase of the controlled-vehicle speed when the controlled-vehicle speed is in a high speed range.

12. The preceding vehicle follow-up control system as claimed in claim 8, wherein the deceleration limit linearly decreases its absolute value according to an increase of the controlled-vehicle speed.

13. A preceding vehicle follow-up control system for a vehicle, comprising:
- vehicle-to-vehicle distance detecting means for detecting a distance between a controlled vehicle and a preceding vehicle;
- controlled-vehicle speed detecting means for detecting a vehicle speed of the controller vehicle;
- vehicle-to-vehicle distance controlling means for calculating a target vehicle speed for bringing the detected vehicle-to-vehicle distance closer to a target vehicle-to-vehicle distance on the basis of the vehicle-to-vehicle distance detected and the controlled-vehicle speed detected; and
- controlled-vehicle speed controlling means for controlling the controlled-vehicle speed to bring the controlled-vehicle speed closer to the target vehicle speed;
- wherein said controlled vehicle speed controlling means comprises target acceleration calculating means for calculating a target acceleration on the basis of the target vehicle speed and target acceleration limiting means for limiting the target acceleration on the basis of the controlled vehicle speed.

14. A preceding vehicle follow-up control system for a vehicle, comprising:
- vehicle-to-vehicle distance detecting means for detecting a distance between a controlled vehicle and a preceding vehicle;
- controlled-vehicle speed detecting means for detecting a vehicle speed of the controller vehicle;
- vehicle-to-vehicle distance controlling means for calculating a target vehicle speed for bringing the detected vehicle-to-vehicle distance closer to a target vehicle-to-vehicle distance on the basis of the vehicle-to-vehicle distance detected and the controlled-vehicle speed detected; and
- controlled-vehicle speed controlling means for controlling the controlled-vehicle speed to bring the controlled-vehicle speed closer to the target vehicle speed;
- wherein said controlled-vehicle speed controlling means comprises preceding-vehicle catch detecting means for detecting whether the preceding vehicle is caught, target acceleration calculating means for calculating a target acceleration on the basis of the target vehicle speed, target acceleration limiting means for limiting the target acceleration on the basis of the controlled-vehicle speed when the preceding vehicle is caught, acceleration limiting means for setting the target acceleration at a predetermined limit when no preceding vehicle is caught and when the controlled vehicle is put in an accelerated condition, and acceleration limit increasing means for increasing the acceleration limit according to a demand of a driver of the controlled vehicle.

15. A method of following-up a preceding vehicle, comprising:
- detecting a distance between a controlled vehicle and a preceding vehicle;
- detecting a vehicle speed of the controller vehicle;
- calculating a target vehicle speed for bringing the detected vehicle-to-vehicle distance closer to a target vehicle-to-vehicle distance on the basis of the vehicle-to-vehicle distance and the controlled-vehicle speed;
- controlling the controlled-vehicle speed to bring the controlled-vehicle speed closer to the target vehicle speed;
- calculating a target acceleration on the basis of the target vehicle speed; and
- limiting the target acceleration on the basis of the controlled vehicle speed.

* * * * *